DRUM-TYPE FACSIMILE RECEIVERS

Filed Feb. 17, 1966

3,449,512

DRUM-TYPE FACSIMILE RECEIVERS

Kenneth George Hoer, Beckenham, Kent, England, assignor to Muirhead & Co Limited, Beckenham, Kent, England, a British company Filed Feb. 17, 1966, Ser. No. 528,312
Claims priority, application Great Britain, Apr. 28, 1965, 17,951/65
Int. Cl. H04n 3/16, 5/38
U.S. Cl. 178—7.3 8 Claims

ABSTRACT OF THE DISCLOSURE

A facsimile drum is rotated at high speed by a first drive from which the drum is disconnected upon completion of the facsimile scanning operation. Simultaneously, the drum is braked to a halt and a second slow speed drive becomes effective for rotating the drum to a predetermined angular position after the brake has been disconnected. The drum may be unloaded and reloaded at the predetermined position after which the first drive can be reconnected for a second scanning operation, this completing a sequence of operations which is repeated cyclically and automatically.

This invention relates to facsimile receivers of the drum type, in which a sheet of photographic paper is loaded around a drum and is then scanned in accordance with a received signal.

Various relatively high speeds of rotation of the drum may be required for the scanning operation.

The present invention comprises a facsimile receiver of the type in which a drum is loaded with a sheet of paper subjected to a scanning operation at a relatively high speed of rotation whereafter the scanned sheet is unloaded, and is characterized by means for braking the drum after the scanning operation, and means operative when the drum has come to a halt to rotate the drum at a lower speed to a predetermined angular position at which the unloading of the photographic paper may commence.

Preferably the braking means comprise a magnetic brake.

Preferably the housing of the magnetic brake is also provided with a limited degree of movement against a spring whereby when the drum comes to a halt, the spring restores the housing to its initial position thus initiating the low speed rotation of the drum.

By these means the unloading operation is effected independently of the number of revolutions of the drum occurring in the braking operation or the angular position of the drum when it comes to a halt.

The invention is now described with reference to the attached drawings.

Figure 2:
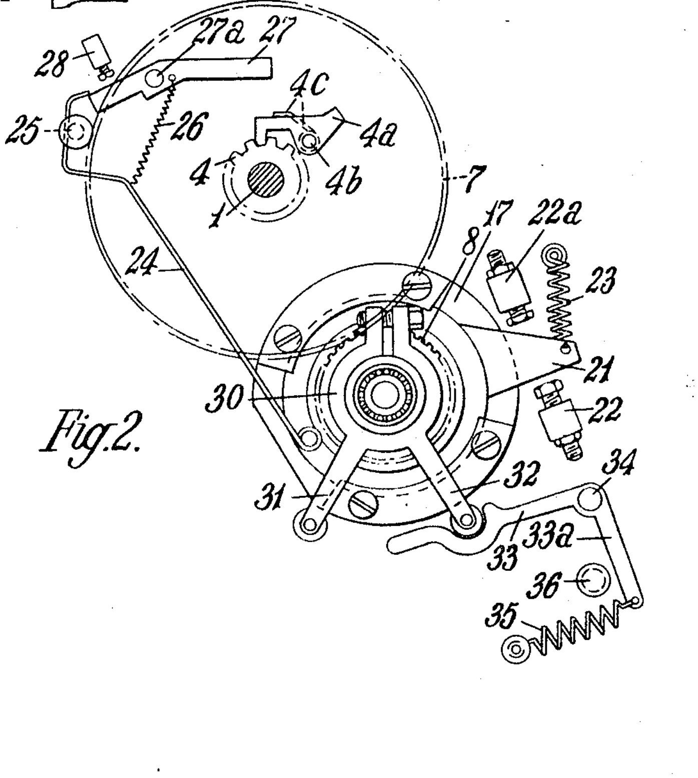
FIGURE 2 is a view in part end elevation showing also the drive and the brake arrangement.
Figures 2A, 3, 4:
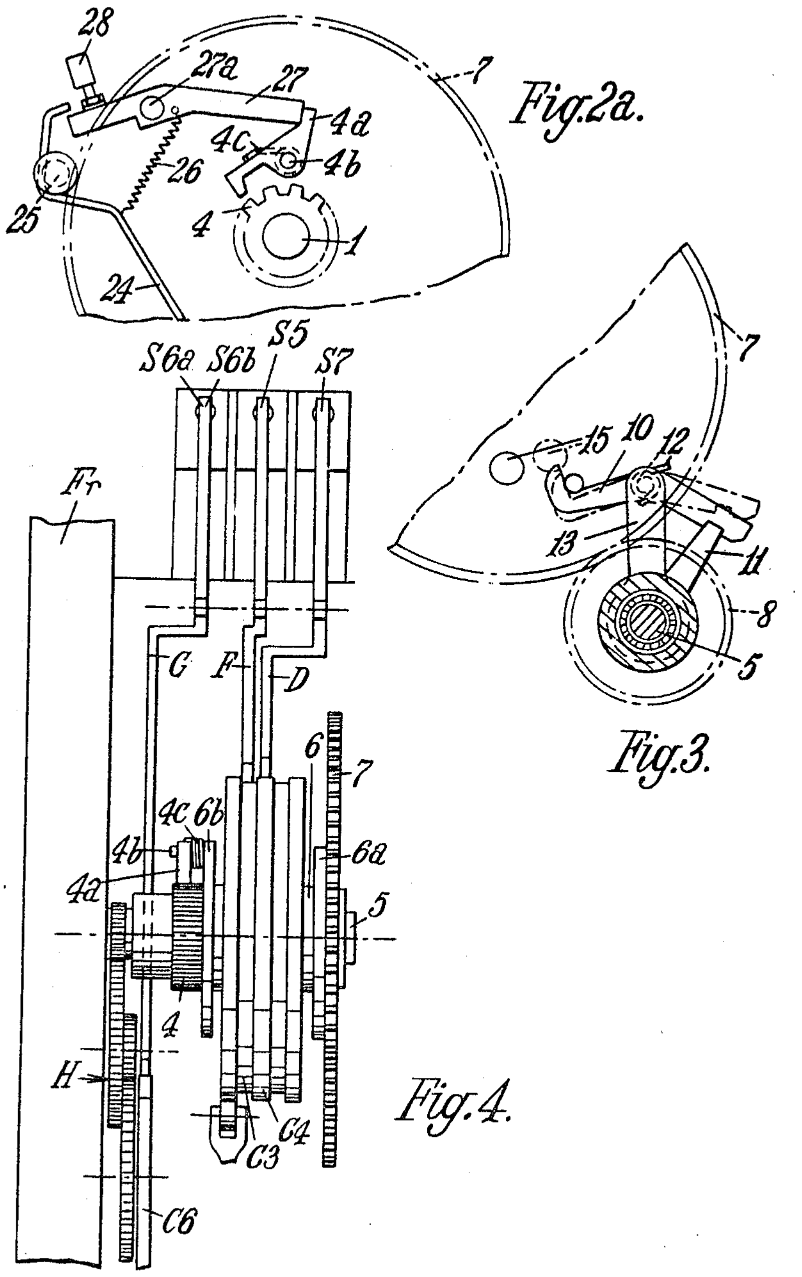

FIGURE 2*a* is a part of the arrangement of FIGURE 2 shown in its other working position.

FIGURE 3 is a view showing the means for arresting the drum drive at the predetermined angular position.

FIGURE 4 is a part front elevation showing a view in part of the drive, microswitches and cams on the drive shaft for operation of the microswitches.

Figure 5:
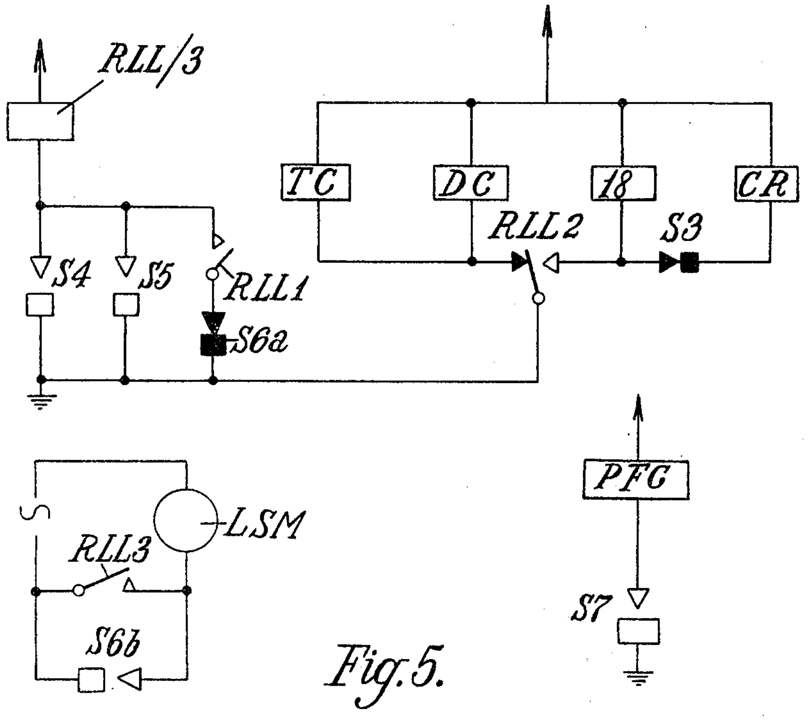

FIGURE 5 is a circuit diagram showing the operation of the associated electrical circuits.

Figure 6:
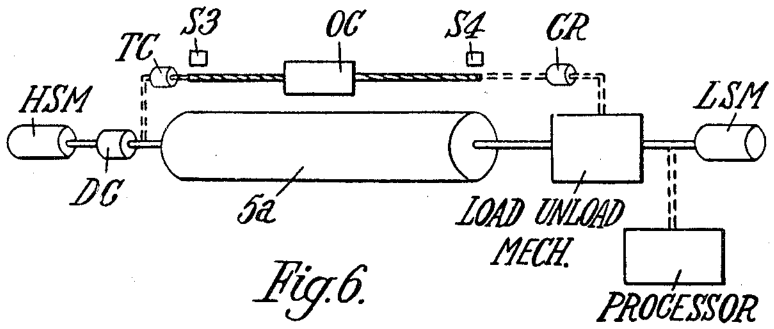

FIGURE 6 is a diagrammatic view of the drum with its driving, scanning and loading and unloading arrangements.

In the drawings 1 is a drive shaft rotatably mounted in a frame F*r* and at one end connected via pulley 2 and a belt 2*a* with a motor (not shown).

A flanged sleeve 6 is freely mounted on the shaft 1. A flange 6*b* of the sleeve 6 carries a pin 4*b* on which latch 4*a* pivots.

In order to transmit drive from the shaft 1 to the sleeve 6, latch 4*a* is urged by a spring 4*c* (see FIGURE 2) to engage a toothed wheel 4 fixed to the shaft 1.

Figure 1:
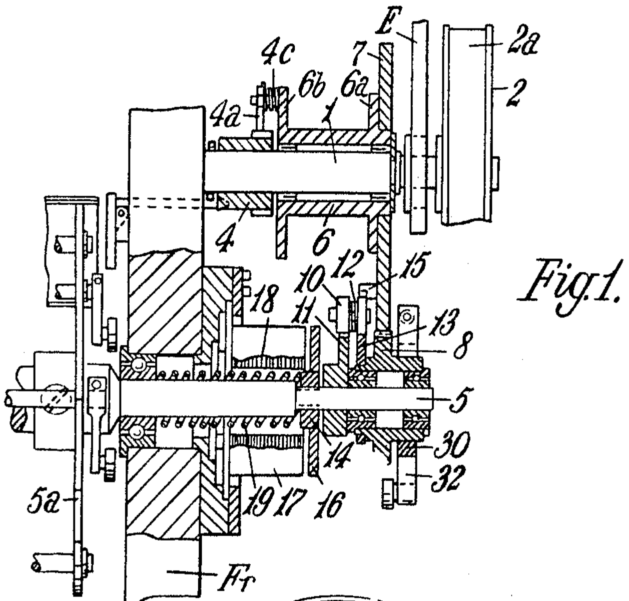
FIGURE 1 is a view in section through the rotation axes of the drum shaft and its driving means, showing the drive and the brake arrangements.

To a flange 6*a* of the sleeve 6 a gear wheel 7 is fixed. This gear meshes with a gear wheel 8 freely mounted on a shaft 5 which is the shaft of a drum 5*a* partly shown in FIGURE 1.

One revolution of gearwheel 7 corresponds to three revolutions of gear wheel 8 (allowing for gaps in the teeth of gear wheel 7 at two places at which the drive to 8 is discontinued as will be explained).

On the gear wheel 8 is fixed an arm 13 which carries a pivotally mounted bell-crank trigger lever 10 (see also FIGURE 3). The bell-crank lever is urged by a spring 12 to lock with one end to an arm 11 fixed to the shaft 5 so as to transmit drive from gear 8 to the shaft 5.

The drive is disengaged when the trigger lever 10 after each revolution of gear 7 comes into contact with a stop 15 (fixed to the face of the gear wheel 7) and which disengages the bell-crank lever trigger 10 from the arm 11. Around the shaft 5 is a magnetic brake comprising a rotationally mounted brake housing 17 provided with a coil 18 and a plate 16. The plate 16 is slidably mounted on a splined bushing 14 fixed to the shaft 5 and when the brake is not engaged this plate 16 is kept away from the face of the brake housing by a coil spring 19 around the shaft 5.

When the coil 18 is energized, the plate 16 contacts the face of the housing 17 rotating it. The rotation of the brake housing 17 on the shaft 5 is limited by an arm 21 secured thereto and extending between two stops 22 and 22*a*. A clockwise rotation of the brake housing 17 is caused by the high-speed rotation of the drum 5*a* when the plate 16 is attracted by the brake housing.

After the limited amount of rotation of the brake housing 17 permitted by the stop 22, it will act as a friction brake on the plate 16 thus slowing down and finally stopping the rotation of the shaft 5. When the shaft 5 has come to rest, an anti-clockwise rotation of the brake housing 17 is caused by a spring 23 which returns the housing 17 back to its initial angular position.

To the brake housing 17 is pivotally attached the lower end of a link 24. The upper end of link 24 is in sliding contact with a pin 25 fixed to the frame F*r* and is bent to a desired shape so that when link 24 moves upwards (the brake housing moving clockwise), the extremity latches over one end of a bell-crank lever 27 pivoted on a pin 27*a* fixed to the frame F*r*. A spring 26 extending between the link 24 and the bell-crank lever 27 helps to maintain the latched position.

A downward movement of the link 24 guided by the pin 25 momentarily releases lever 27 from engagement with the extremity of the upper end of latch 4*a* and the latch 4*a* is rotated (by spring 4*c*) until it engages toothed wheel 4. Because of its shape, the continued downward movement of link 24 releases lever 27 which is restored by spring 26.

The right-hand end of lever 27 is, however, immediately restored by the action of spring 26 so that it will be ni the way of the approaching latch 4*a* after gear wheel 7 has completed a revolution. Latch 4*a* will then be rotated and disengages from the toothed gear 4 thereby disengaging the drive, the purpose of which will be explained later.

On the gear wheel 8 is fixed a sleeve 30 having two arms 31 and 32. Each arm has a roller at its end which can contact a bell-crank lever 33 pivotally mounted on a pivot 34 fixed to the frame and the purpose of which is to hold the shaft 5 (and thus the drum 5*a*) in the two respective positions in which there is no engagement between gears 8 and 7 due to the missing teeth on the gear wheel 7. The arm 33 is urged to contacting position with the approaching rollers by means of a spring 35 fixed to the frame F*r* and to the arm portion 33*a* of the arm 33.

When the rollers of arms 31, 32 are not in contact with the arm 33, arm portion 33*a* abuts a stop 36 fixed to the frame and prevents arm 33 from tilting over.

Referring now to FIGURE 4, C is a set of cams mounted on the flanged sleeve 6 and rotating together with this sleeve. Cams C3 and C4 are for activating microswitches S5 and S7 by means of cam followers F and D respectively. Microswitches S6*a* and S6*b* are operated by a follower G and a cam C6 which is driven by the shaft 1 via a set of reduction gears H. Contact S6*a* provides a holding circuit for a relay RLL/3 and S6*b* provides a holding circuit for motor LSM (FIGURE 5).

In FIGURE 6 there is shown the high speed motor HSM for driving the drum 5*a* over a clutch DC and for driving the optical carriage OC over a clutch TC. There is also shown the low speed motor LSM driving the drum, the paper loading and unloading arrangements, the paper processor and the return for the optical carriage (over clutch CR). The limit switches S3 and S4 for the optical carriage OC are also shown.

In order to explain how the above described arrangement works the operation shall be considered from the time that during a transmission the optical carriage OC is approaching its limit switch S4. Under these conditions the drum is being driven by the high speed motor HSM through the electrically operated clutch DC. The low speed motor LSM which drives the paper load/unload mechanism and also the picture processing arrangement is de-energized and de-clutched from the paper load/unload mechanism.

When, finally, the optical scanner reaches the end of its traverse switch S4 is thereby operated (FIGURE 6). As shown in FIGURE 5, operation of S4 energizes relay RLL/3. Contact RLL3 energizes the slow speed motor LSM which, at this stage, only drives cam C6 over reduction gear H and free running shaft 1 (FIGURE 4). Cam C6 takes approximately 27 seconds to complete one revolution and is hereinafter referred to as the 27-second cam. (Cams C3 and C4 take approximately 5 seconds to complete one revolution and are hereinafter referred to as the 5-second cams.) Contact RLL1 over S6*a* provides a short term holding circuit for relay RLL/3 against the opening of S4 until the closing of S5. Contact RLL2 disengages the drum clutch DC thereby disconnecting the drum shaft 5 from the high speed motor, disengages the traverse clutch TC thereby stopping the optical scanner, energizes the drum brake coil 18 (FIGURE 1) and energizes the optical carriage return clutch CR over switch S3. (This latter function connects the optical carriage to the low speed motor which returns it to the "start" position and is arrested thereat by the opening of S3 which de-energizes clutch CR.)

Contact S6*b* on 27-second cam C6 provides a holding circuit for the low speed motor LSM against the release of contact RLL3 after 5 seconds. Thus motor LSM is energized for 27 seconds, the period required to process the picture.

Owing to the operation of contact RLL2, as has been said, drum 5*a* is de-clutched from the high speed motor and is free to rotate under its own inertia.

Due to the inertia of the still rotating drum, the brake housing 17 and arm 21 rotate until arm 21 is stopped by stop 22. The rotation of housing 17 causes link 24 to move upwards.

In this position the extremity of the link 24 is guided clear of the end of the left-hand arm of lever 27, while the latter is in contact with adjustable stop 28 (see FIGURE 2*a*) having been brought to this position by means of spring 26. The end of the right-hand portion of lever 27 holds latch 4*a* out of engagement with toothed wheel 4 against the action of spring 4*c* when gear wheel 7 has turned to the position shown in FIGURE 2*a*. Gear wheel 7 thus is stationary.

When the drum comes to rest spring 23 returns arm 21 to stop 22*a*. At the same time the drum shaft 5 and the brake housing 17 turn backwards.

On downward movement of link 24, abutment 27 is released out of engagement with the extremity of latch 4*a* which turns under the influence of spring 4*c* to engage the toothed wheel 4.

Abutment 27 then returns under the action of spring 26 until arrested by stop screw 28. Latch 4*a* rotates transmitting drive from the shaft 1 (driven by the slow speed motor) to the flanged sleeve 6 and gear wheel 7.

During its rotation gear wheel 7 over cam C3 will operate switch S5 which holds the aforementioned relay energized against the operation of S6*a*.

Gear wheel 7 meshes with gear wheel 8 and rotates lever 10 which searches for arm 11 on the shaft 5 which had stopped due to the previous brake application.

The searching operation is completed at a point during one revolution of gear wheel 8, depending on the angular position of arm 11.

After the engagement of lever 13 with the arm 11 has been made, the drum 5*a* is rotated to a definitive position ready to commence unloading operation of the photographic paper completing the first revolution of gear wheel 8.

The drum is then driven a second revolution to discharge the photographic paper from the drum by means not directly concerned with the present invention.

Just before the end of this second revolution of the drum 5*a*, a paper feed clutch PFC is activated by the switch S7. After this one revolution, the drum 5*a* stops for some time due to the gap in the teeth of gear wheel 7 and is held in position by means of arrangement 33, 33 previously described.

During this time, the photographic paper from a roll is delivered (by the feed mechanism) on to the drum.

Drum 5*a* is driven a third revolution during which a previous end of the sheet of photographic paper is released and is fed by means of rollers (operated from the same motor) to fixing and developing trays of the processor while new paper is wound around the drum and the paper feed clutch PFC is disconnected by S7. Before the end of this revolution drum 5*a* is stopped again by a gap in the teeth of gear wheel 7 while the photographic paper is being cut by a guillotine operated by a cam. The drum is held stationary during this operation by the arrangement 31, 33.

After the guillotine operation, gear wheels 7 and 8 mesh again to complete the third revolution of the drum and to secure photographic paper on the drum by means which do not concern the present invention.

At the end of the third revolution the gear wheel 7 has completed one revolution and stop 15 engages lever 10, thus releasing arm 11 and disengaging drum 5*a* from the drive.

Immediately thereafter, wheel 7 per se is arrested by the latch 4*a* engaging the abutment 27 and retracting from engagement with the notched wheel 4. The relay RLL/3 is disconnected by means of switch S5 operated from cam C3 and restores. The coil 18 is thus de-energized. The slow speed motor continues to drive while the photographic paper which was unloaded from the drum is passed through its developing and fixing bath. After twenty-seven seconds switch S6 restores and at S6*b* the circuit of the slow speed motor is opened. A high speed motor is now connected to the opposite end of the shaft 5 and is driven to perform the next scanning operation.

After the scanning operation the cycle of operation is repeated.

I claim:

1. A facsimile receiver comprising a facsimile drum, first drive means for rotating the drum at a scanning speed, frictional braking means for braking the drum on the completion of a scanning operation, release means operative when the drum comes to a halt to release the frictional braking means and second drive means operative after the release of said frictional braking means to drive the drum at a second speed lower than the scanning speed to a predetermined angular position which is independent of the position in which the drum has been braked to a halt by said frictional braking means.

2. A facsimile receiver comprising a facsimile drum, first drive means for rotating the drum at a scanning speed, frictional braking means for braking the drum on completion of a scanning operation, release means operative when the drum comes to a halt to release the frictional braking means, and second drive means operative after the release of the frictional braking means to drive the drum at a second speed lower than the scanning speed to a predetermined angular position which is independent of the position in which the drum has been braked to a halt by said frictional braking means, and the braking means comprising a brake housing having a limited degree of travel under the influence of the braking action.

3. The facsimile receiver as claimed in claim 2 comprising spring means for restoring the brake housing to its initial position after the housing has been deflected by the braking action and means operated by the restoring movement of the brake housing for activating the second drive means for the drum.

4. The facsimile receiver as claimed in claim 3 in which the said means for activating the second drive means comprise a rotary member, a toothed wheel, a low speed drive therefor, a latch mounted on the rotary member and engaging in the toothed wheel, spring means for effecting said engagement, abutment means acting to hold the latch out of engagement with the wheel and means acting to release the abutment means, when operated by the restoring movement of the brake housing, to permit the latch to engage the toothed wheel under the influence of the spring means.

5. The facsimile receiver as claimed in claim 4 comprising further spring means for restoring the abutment means into the path of the latch.

6. The facsimile receiver as claimed in claim 5 comprising a first gear wheel on the rotary member and a second gear wheel internesting therewith and engaging the drum.

7. The facsimile receiver as claimed in claim 6 comprising a search arm on the second gear wheel, a further arm rotating with the drum and arranged to be picked up by the search arm as the latter is rotated.

8. The facsimile receiver as claimed in claim 7 comprising means on the first gear wheel for releasing the search arm from engagement with the further arm when the first gear wheel has completed a rotation.

References Cited

UNITED STATES PATENTS

| | | | |
|---|---|---|---|
| 2,601,236 | 6/1952 | Asten | 178—7.1 |
| 2,839,603 | 6/1958 | Foll et al. | 178—7.1 |
| 2,883,453 | 4/1959 | Foll et al. | 178—7.1 |
| 3,060,262 | 10/1962 | Hoer | 178—7.1 |

ROBERT L. GRIFFIN, *Primary Examiner.*

ALFRED H. EDDLEMAN, *Assistant Examiner.*

U.S. Cl. X.R.

192—33, 35, 139